US009838084B2

(12) United States Patent
Khandelwal et al.

(10) Patent No.: US 9,838,084 B2
(45) Date of Patent: Dec. 5, 2017

(54) CONTROL OF A TANK CIRCUIT IN A WIRELESS POWER TRANSMISSION SYSTEM PROVIDING FSK COMMUNICATION

(71) Applicant: Texas Instruments Incorporated, Dallas, TX (US)

(72) Inventors: Ashish Khandelwal, Irving, TX (US); Robert A. Neidorff, Bedord, NH (US)

(73) Assignee: Texas Instruments Incorporated, Dallas, TX (US)

( * ) Notice: Subject to any disclaimer, the term of this patent is extended or adjusted under 35 U.S.C. 154(b) by 550 days.

(21) Appl. No.: 14/502,285

(22) Filed: Sep. 30, 2014

(65) Prior Publication Data

US 2016/0094278 A1 Mar. 31, 2016

(51) Int. Cl.
*H03L 7/10* (2006.01)
*H04B 5/00* (2006.01)
*H01F 38/14* (2006.01)

(52) U.S. Cl.
CPC ........... *H04B 5/0037* (2013.01); *H01F 38/14* (2013.01)

(58) Field of Classification Search
CPC .................................................. H04B 5/0037
USPC ........................................................ 307/104
See application file for complete search history.

(56) References Cited

U.S. PATENT DOCUMENTS

| 5,168,245 | A | * | 12/1992 | Koskowich | ............... | H03L 7/10 |
| | | | | | | 331/1 A |
| 5,504,485 | A | | 4/1996 | Landt et al. | | |
| 5,614,851 | A | | 3/1997 | Holzer et al. | | |
| 6,269,058 | B1 | * | 7/2001 | Yamanoi | ................ | G11B 19/28 |
| | | | | | | 360/51 |
| 8,179,088 | B2 | | 5/2012 | Takaishi et al. | | |
| 8,669,678 | B2 | | 3/2014 | Urano | | |
| 9,041,254 | B2 | | 5/2015 | Lisuwandi et al. | | |
| 9,112,364 | B2 | | 8/2015 | Partovi | | |
| 9,362,756 | B2 | | 6/2016 | Khandelwal et al. | | |
| 2002/0057584 | A1 | | 5/2002 | Brockmann | | |
| 2009/0174263 | A1 | | 7/2009 | Baarman et al. | | |
| 2012/0022613 | A1 | * | 1/2012 | Meskens | ................ | H02J 17/00 |
| | | | | | | 607/57 |
| 2012/0212068 | A1 | | 8/2012 | Urano | | |
| 2013/0154373 | A1 | | 6/2013 | Lisuwandi et al. | | |
| 2014/0097791 | A1 | | 4/2014 | Lisuwandi | | |
| 2014/0106826 | A1 | | 4/2014 | Yeo et al. | | |
| 2014/0191568 | A1 | | 7/2014 | Partovi | | |
| 2014/0368050 | A1 | | 12/2014 | Chun et al. | | |
| 2015/0108847 | A1 | | 4/2015 | Taylor et al. | | |

(Continued)

*Primary Examiner* — Joseph Chang
(74) *Attorney, Agent, or Firm* — Lawrence J. Bassuk; Charles A. Brill; Frank D. Cimino

(57) ABSTRACT

A transmitter circuit in a wireless power transmission system has a tank circuit, having an inductor and a capacitor, the inductor being couplable to the inductor of a receiver circuit. An oscillator generates an oscillation frequency signal for driving the tank circuit. A first digital-to-analog converter (DAC) provides a first control signal to control the oscillating frequency of the oscillator. A frequency shift keying (FSK) circuit changes a digital signal input to the digital-to-analog converter for shifting the oscillation frequency utilized to drive the tank circuit, the FSK signal transmitting data or commands to the receiver circuit. A method of transmitting FSK signals in a wireless power transmission system is also disclosed.

12 Claims, 4 Drawing Sheets

FIG. 2

(56) References Cited

U.S. PATENT DOCUMENTS

2015/0171634 A1 6/2015 Neidorff
2016/0352146 A1 12/2016 Khandelwal et al.

* cited by examiner

CONTROL OF A TANK CIRCUIT IN A WIRELESS POWER TRANSMISSION SYSTEM PROVIDING FSK COMMUNICATION

CROSS-REFERENCE TO RELATED APPLICATIONS

This application is related to U.S. Application Number; U.S. Application Number; and U.S. Application Number all filed on even date, which are incorporated herein by reference in their entirety for all purposes

FIELD

The invention relates to a circuit and method for driving a tank circuit in a wireless power transmission system, and more specifically, to a circuit and method for also generating FSK signals.

BACKGROUND

The explosion of small portable electronic devices such as cell phones has led to the desire to be able to recharge the device without the necessity of attaching a cord to the device. A solution that accomplishes this task is known as "wireless power". The term "wireless power" as utilized herein refers to the transmission of electrical energy from a power source to an electrical load without interconnecting wires. A common form for wireless power transmission utilizes two electromagnetically coupled coils to form a transformer through which power is transferred from the primary side to the receiving side. The transmitter may take the form of a pad having a coil embedded therein. The receiver may be built into a cellular telephone, for example, with the receiving side coil built into the back thereof. Although there is no direct contact between the transmitting and receiving coils, the close proximity of the coils, and the judicious use of shielding, allows for efficient transfer of energy from the transmitting side to the receiving side to operate a load, which may be a rechargeable battery being recharged by the system, for example.

FIG. 1 shows a block diagram of a prior art wireless power transmission system, generally as 100. The system comprises a transmitter side 102 and a receiver side 122. The transmitter side 102 comprises a circuit 104 for rectifying an AC input into a DC voltage which is fed into a power stage 106 for generating a high frequency signal. The high-frequency signal is coupled across a transformer 120 to the receiver side 122. The power stage 106 is controlled by controller 108 which could be combined into a single integrated circuit with the power stage 106. The receiver side 122 comprises a rectifier circuit 124 to output a DC voltage and a voltage conditioning circuit 126 which is operated by the receiver controller 128 to supply power to a load 130, which may be a rechargeable battery being recharged by the system, for example.

As shown in FIG. 1, power flows from left to right from the transmitter to the receiver and communications flows from right to left from the receiver to the transmitter. The communication signals may be command signals to adjust the power level from the transmitter or other parameters, for example. The communication signals may be generated by coupling a resistor or capacitor across the receiving coil to generate signals which can be recognized by the controller on the transmitting side. The low-level signals are noisy because of the noise generated by the power transmission portion of the system.

The circuits discussed above generally relate to one-way communication between the receiver and the transmitter. Two-way circuits are also known in the art. However, there is a desire for a more robust solution to two-way communications which is simpler in circuit configuration.

SUMMARY

It is a general object to provide a circuit to drive a tank circuit of a transmitter for a wireless power transmission system so that it can also generate FSK signals for transmitting data or commands to a receiver.

In an aspect in a wireless power transmission system, a transmitter circuit comprises a tank circuit having an inductor and a capacitor, the inductor being couplable to the inductor of a receiver circuit. An oscillator generates an oscillation frequency signal for driving the tank circuit. A first digital-to-analog converter (DAC) provides a first control signal to control the oscillating frequency of the oscillator. A frequency shift keying (FSK) circuit changes a digital signal input to the digital-to-analog converter for shifting the oscillation frequency utilized to drive the tank circuit, the FSK signal transmitting data or commands to the receiver circuit.

Another aspect of the invention includes a transmitter circuit for a wireless power transmission system, comprising a digitally-controlled oscillator generating an oscillation frequency signal for driving a tank circuit, the digitally-controlled oscillator being able to be digitally-programmed to change the oscillation frequency to transmit frequency shift keying (FSK) signals to a receiver circuit that are electromagnetically coupled to the tank circuit. A control circuit generates digital commands to control the digitally-controlled oscillator to transmit the FSK signals.

A further aspect includes a method of transmitting a frequency shift keying (FSK) signal from a transmitter circuit to an electromagnetically coupled receiver circuit in a wireless power transmission system, comprising electromagnetically coupling a tank circuit in the transmitter circuit with a tank circuit in a receiver circuit. Generating an oscillation frequency signal for the transmitter circuit tank circuit for transmitting power to the receiver circuit. Changing a digital value input to a digital-to-analog converter (DAC) for controlling the oscillation frequency by frequency shift keying the oscillation frequency of the transmitter tank circuit to transmit data or commands to the receiver circuit.

BRIEF DESCRIPTION OF DRAWINGS

Further aspects of the invention will appear from the appending claims and from the following detailed description given with reference to the appending drawings.

DETAILED DESCRIPTION

In one-way communications in a wireless power transmission system, the signal sent from the receiver to the transmitter may be amplitude modulated. The data present in this datastream can be recovered according to known circuits or can utilize the circuits shown in co-pending applications (TI-74614, TI-74615, and TI-73620) filed on even date which are incorporated herein by reference in their entirety for all purposes. The data received from the data stream is then processed by a microcontroller (or microprocessor) which is then utilized to adjust the frequency of the tank circuit. The tank circuit may have, for example, a resonance of about 100 kHz. By varying the frequency of the signal utilized to excite the tank circuit between 110 and 210 kHz, the amount of power supplied to the load (the receiver) can be varied.

In the discussion below, the data has already been extracted from the data stream and processed by a microcontroller to yield a 4-bit control word to adjust the frequency of the excitation signal that drives the tank circuit. The tank circuit may be driven, for example, by two half-bridge driver circuits, as is known in the art. The microcontroller generates a 3-bit control signal and a control clock, the functions of which are shown in Table 1 below:

| MODE | PWM_CRTL | DNUP | CLKIN | Effect |
| --- | --- | --- | --- | --- |
| 0 | 0 | 1 | @rising edge | Decrease Freq (Increase power) |
| 0 | 0 | 0 | @rising edge | Increase Freq, (Reduce power) |
| 0 | 0 | 0 | @rising edge | Decrease Duty Cycle (Reduce power) |
| 0 | 0 | 1 | @rising edge | Increase Duty Cycle (Increase power) |

The MODE signal controls whether or not the frequency would be changed, (either increased or decreased), or whether the duty cycle of the signal used to excite the tank circuit would be increased or decreased. The PWM_CTRL controls whether the microcontroller will generate a frequency used to excite the tank circuit or, as shown, the internal oscillator circuit, shown in FIG. 2 and discussed below. The DNUP signal controls whether the frequency will be increased or decreased; or the duty cycle increased or decreased. The signal CLKIN is the input clock in which changes are made on the rising edge of the clock. The rising edge of the clock will increase or decrease the frequency by one step, for example. The step can be the frequency range divided by the number of bits in a counter that controls a DAC, for example.

Figure 1:
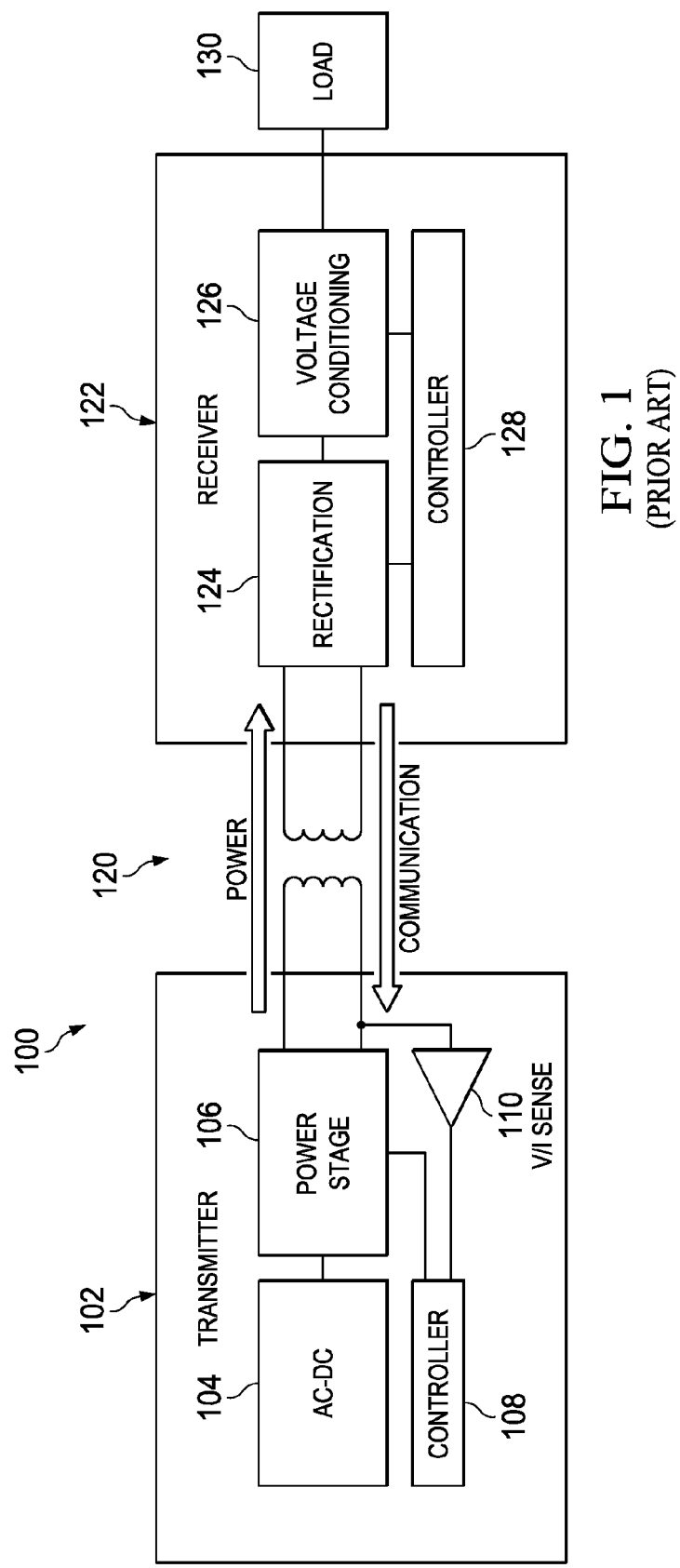
FIG. 1 is a diagram of a wireless power system according to the prior art.
Figure 2:
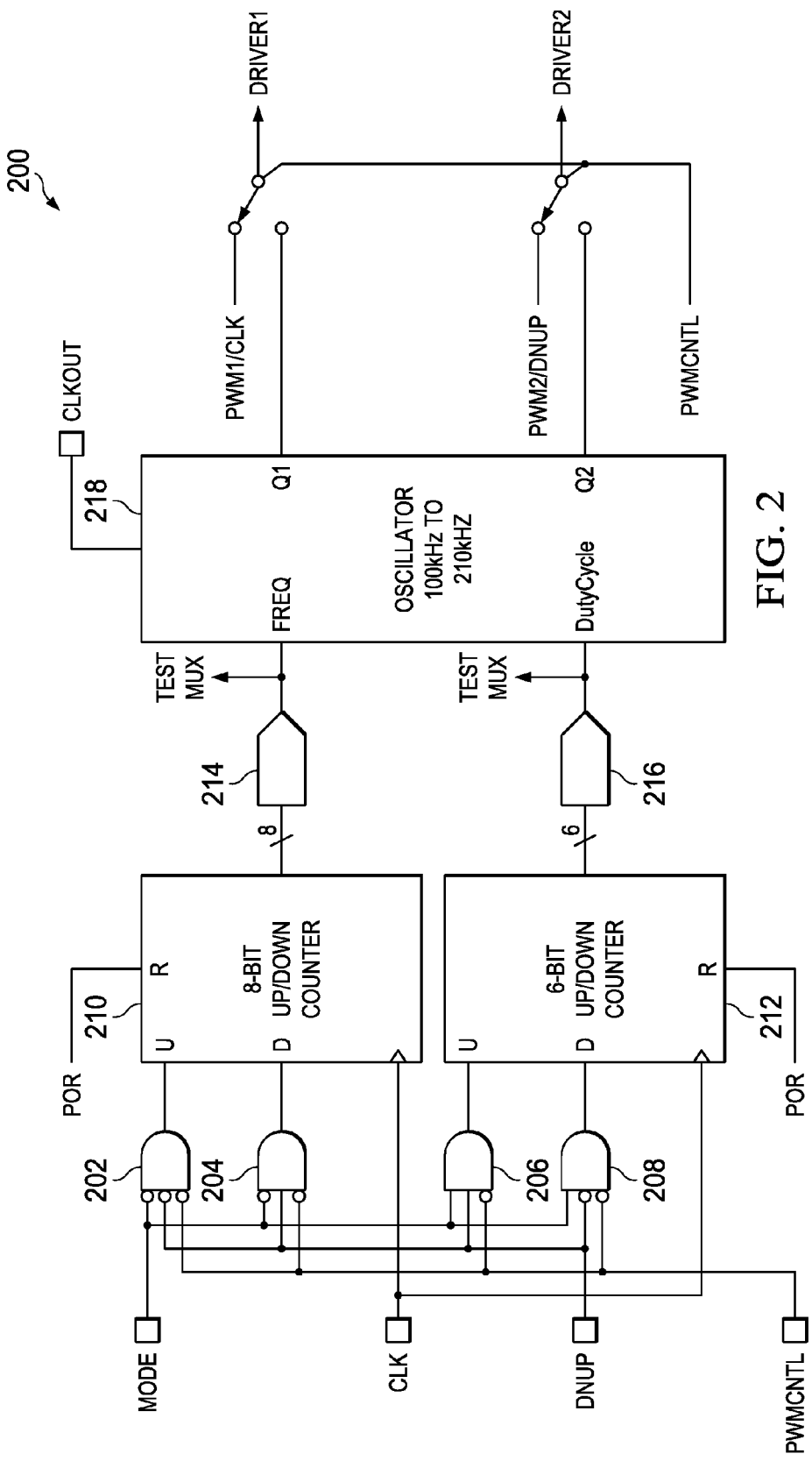
FIG. 2 is a block diagram of a system for driving a tank circuit in a wireless power transmission system constructed according to the principles of the present disclosure.

FIG. 2 shows an oscillator circuit for generating the frequency used to excite the tank circuit (not shown), generally as 200. In FIG. 2, the three input signals and the clock are input into two up/down counters through logic gates. Thus, the inverted MODE signal is input to AND gate 202, the output of which is connected to the up count input to 8-bit up/down counter 210. This inverted MODE signal is also applied to AND gate 204, and the non-inverted MODE signal is applied to AND gates 206 and 208. The output of AND gate 204 is connected to the down count input to 8-bit up/down counter 210. The output of AND gate 206 is connected to the input of 6-bit up/down counter 212 and the output of AND gate 208 is connected to the down input of that counter. The inverted PWMCNTL signal is coupled to AND gates 202, 204, 206 and 208. The inverted DNUP signal is also connected to the AND gates 202, and 208 and the non-inverted DNUP signal is connected to the input of AND gates 204, 206. The CLK signal is connected to the clock inputs of the two counters. The output of 8-bit up/down counter 210 is coupled to the digital-to-analog converter (DAC) 214 and generates an analog signal which is used to control the frequency of oscillator 218 between, for example, 100 kHz and 210 kHz. The output of 6-bit up/down counter 212 is coupled to DAC 216 which generates an analog signal which controls the duty cycle of the pulses from the oscillator 218. The Q1 and Q2 outputs of the oscillator are connected to Driver 1 and Driver 2 to drive the half-bridges discussed above. Also shown in FIG. 2, the signal PWMCNTL can cause the output to be multiplexed to signals generated directly by the microcontroller. The output CLKOUT of oscillator 218 is fed back to the microcontroller for comparing the output of the oscillator to the desired output In operation, the microcontroller generates the signals shown in Table 1 which causes the 8-bit up/down counter to either increase or decrease by one step at the rising edge of the clock. This signal is applied to DAC 214 to the frequency input of oscillator 218 which changes the frequency at which the oscillator will work by one step. Similarly, the signals can be used to instruct the 6-bit up/down counter 212 to increase or decrease by one count, which is output through DAC 216 to control the duty cycle of the oscillator signals generated.

Figure 3:
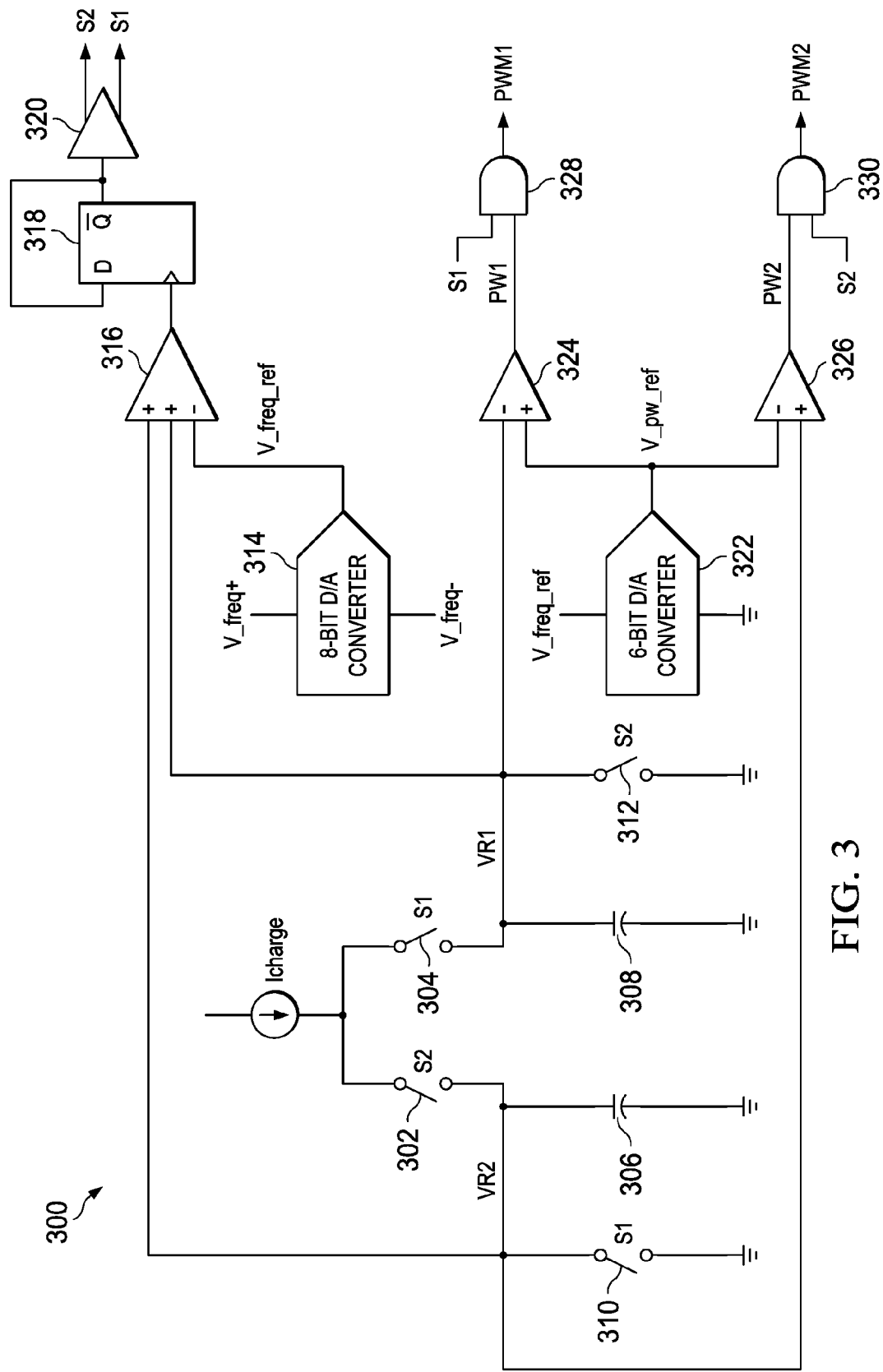
FIG. 3 is a schematic block diagram of the oscillator for the system of FIG. 1.

An oscillator circuit suitable for use at the oscillator 218 is shown in FIG. 3, generally as 300. The oscillator 300 is a dual ramp oscillator utilizing a constant current source Icharge which generates the ramp signals utilizing capacitors 306 and 308. The charge from Icharge will flow through either switch 302 or switch 304 to charge capacitor 306 or capacitor 308 which are coupled between the switches and ground. Switch 310 discharges capacitor 306 to ground and switch 312 discharges capacitor 308 to ground. Switches 304 and 310 are operated by the signal S1 generated by the differential output circuit 320 and the switches 302 and 312 are operated by the signal S2 also generated by the differential output circuit 320. The node VR1 is connected to a non-inverting input of comparator 316. Thus, the voltage across capacitor 308, is compared to a reference by the comparator 316. Similarly, the node VR2 is coupled to a non-inverting input of comparator 316 so the voltage across capacitor 306 is compared to a reference by the comparator 316. The reference voltage V_freq_ref is generated by the 8-bit DAC 314 which is coupled to the inverting input of comparator 316 and provides the reference voltage against which voltages VR1 and VR2 are compared.

Figure 4:
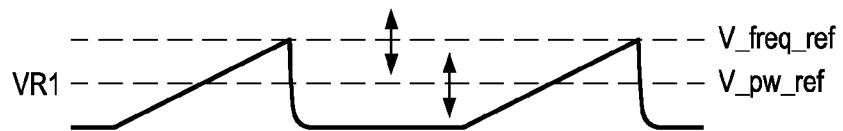
FIG. 4 shows the waveforms at node VR1 of FIG. 2.
Figure 5:
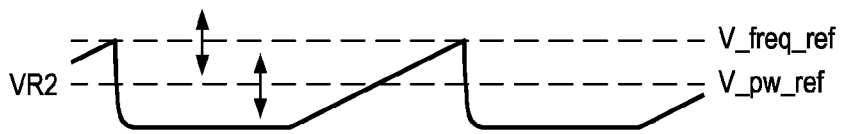
FIG. 5 shows the waveforms at node VR2 of FIG. 2.

The voltages V_Freq+ and V_Freq− are the positive and negative reference voltages, respectively, for the 8-bit DAC 314. Referring now to FIGS. 4 and 5, the voltages VR1 and the VR2 are shown as sawtooth waves, 180° out of phase with each other, which are switched when the voltage across the capacitor 308 at VR1 reaches V_freq_ref and when the voltage across capacitor 306 reaches V_freq_ref. Thus, the frequency of the oscillator can be changed by varying the reference voltage V_freq_ref. The reference voltage is generated by the 8-bit DAC and the frequency is changed by the signal DNUP when both of the signals MODE and PWM_CTRL are zero, see Table 1.

The node VR1 is coupled to the inverting input of the comparator 324 and the node VR2 is connected to the non-inverting input of comparator 326. The non-inverting input to comparator 324 and inverting input of comparator 326 of both coupled to the signal V_pw_ref which is output from the 6-bit DAC 322. The output of comparator 324 passes through AND gate 328, the other input of which is coupled to the signal S1. The output of comparator 326 passes through AND gate 330, the other input of which is coupled to the signal S2. The output of AND gate 328 is the signal PWM1 which drives the first half-bridge circuit which drives the tank circuit and the output of AND gate 330 is the signal PWM2 which drives the second half-bridge to drive the tank circuit.

Figure 6:
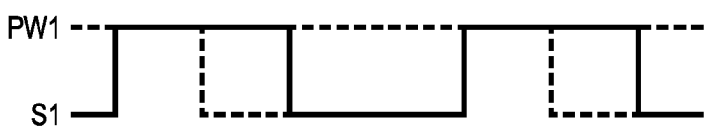
FIG. 6 shows the signals PW1 and S1.
Figure 7:
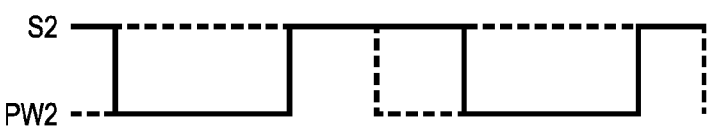
FIG. 7 shows the signals PW2 and S2.

The output of comparator 316 clocks flip-flop 318 in which the Q not output is coupled to the data input. This causes the flip-flop 318 to alternately change states. The output of flip-flop 318 is coupled to differential output circuit 320 which generates the signals S1 and S2, which are 180° out of phase with respect to each other. The signals, in turn, are used to drive the switches 302, 304, 306, and 308 as well as provide the second inputs to AND gates 328 and 330. FIGS. 6 and 7 show the signals S1 and S2 as well as the signals PW1 and PW2, which are the outputs of comparators 324, 326, respectively.

Figure 8:
FIGS. 8 and 9 show adjusting the duty cycle of the signals PWM 1 and PWM 2.
Figure 9:
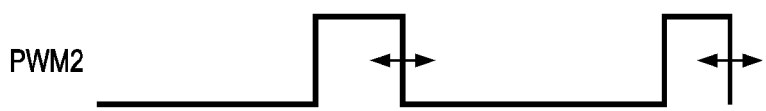

Referring now to FIGS. 4 and 5 and FIGS. 8 and 9, we see that there is a second reference V_pw_ref which is output from the 6-bit DAC 322 and used to change the duty cycle of the signals PWM 1 and PWM 2 which are used to drive the half-bridge circuits which excite the tank circuit. As can be seen in FIGS. 8 and 9, the duty cycle is changed by changing the timing of the trailing edge of the drive pulses, so the pulse always remains 180° out of phase. The power delivered to the load (receiver) is controlled by varying the frequency used to excite the tank circuit. If the tank circuit has a resonant frequency of 100 kHz, for example, then utilizing a frequency of 110 to 210 kHz allows power to be transmitted to the receiver and various power levels. The further the frequency used to excite the tank circuit is away from the resonant frequency, the less power that will be transmitted. However, if the circuit reaches the 210 kHz frequency and still too much power is being transmitted to the receiver, the transmitter circuit then goes into a second mode in which the duty cycle of the drive signal is reduced. For example, the duty cycle can be reduced from substantially 50% to as little as substantially 10% in order to reduce power to the receiver.

The data stream signal from the receiver can be amplitude modulated, as described more fully in commonly owned co-pending applications (TI-74614 and TI-74615), filed on even date and incorporated herein by reference in their entirety for all purposes. Accordingly, if a transmission of data from the transmitter to the receiver is to be provided, another form of modulation is needed. One type of modulation that can be used is frequency shift keying (FSK). The present invention allows for generating data signals utilizing FSK by utilizing the same circuit that is used to excite the tank circuit. Thus, the need for additional circuitry and expense is avoided. The changing of frequency of the tank circuit is then transmitted electromagnetically from the transmitter coil to the receiver coil, which can then be decoded.

The generation of FSK signals is accomplished by changing the setting of the 8-bit up/down counter 214 in discrete steps to generate, for example, one of eight possible frequency settings. The most significant bit of a 3-bit code output from the microcontroller (not shown) determines whether or not the frequency is to be increased or decreased, so that two bits of data can be sent with a single frequency change. The frequency change can be implemented by changing the DAC code for a fixed number of steps. For example, the number of steps could be −2, −3, −6, or −12 if the DNUP signal is a digital one, or +2, +3, +6 or +12, or if the DNUP signal is a digital zero. The frequency of the steps can correspond to the range of frequencies output from the oscillator divided by the number of bits in the counter used to control the frequency, for example. Data transmission and adjusting the power transmitted are not performed at the same time in order to avoid conflicts.

Although the invention has been described in detail, it should be understood that various changes, substitutions and alterations can be made thereto without departing from the spirit and scope of the invention as defined by the appended claims.

The invention claimed is:

1. An oscillator circuit comprising:
    (a) a mode input, a clock input, and a down/up input;
    (b) a first up/down counter having an up input, a down input and parallel bit outputs;
    (c) a second up/down counter having an up input, a down input and parallel bit outputs;
    (d) gating circuits having inputs and outputs coupling the mode input and down/up input to the first and second up/down counters;
    (e) a first digital to analog converter having inputs coupled to the parallel bit outputs of the first up/down counter and having a frequency voltage reference output;
    (f) a second digital to analog converter having inputs coupled to the parallel bit outputs of the second up/down counter and having a duty cycle voltage reference output;
    (g) oscillator circuitry having a frequency input coupled to the output frequency voltage reference output, a duty cycle input coupled to the duty cycle voltage reference output, a frequency output, and a duty cycle output.

2. The oscillator circuit of claim 1 in which the first up/down counter is an 8 bit counter having 8 parallel bit outputs.

3. The oscillator circuit of claim 1 in which the second up/down counter is a 6 bit counter having 6 parallel bit outputs.

4. The oscillator circuit of claim 1 in which the gating circuit includes AND gates with inverting and non-inverting inputs.

5. The oscillator circuit of claim 1 including a PWN CNTL input coupled to an input of the gating circuits.

6. The oscillator circuit of claim 1 including a PWM1/CLK node, a first driver node, a PWM2/NUP node, a second driver node, and a PWN CNTL input causing the first driver node to switch between the frequency output and the PWM1/CLK nod and causing the second driver node to switch between the PWM2/DNUP node and the duty cycle output.

7. An oscillator circuit comprising:
    (a) a dual ramp oscillator having a constant current source generating ramp signals through a first series connection of a first switch and first capacitor, a second series connection of a second switch and second capacitor, a third switch in parallel to the first capacitor to ground, and a fourth switch in parallel to the second capacitor to ground, the first and fourth switches having an S1 input and the second and third switches having an S2 input;
    (b) a first comparator having a first input, a second input connected to between the first switch, the first capacitor, and the third switch, a third input connected to between the second switch, the second capacitor, and the fourth switch, and an output;
(c) a second comparator having a first input, a second input connected to between the first switch, the first capacitor, and the third switch, and a PW1 output;
(d) a third comparator having a first input, a second input connected to between the second switch, the second capacitor, and the fourth switch, and a PW2 output;
(e) a first gate having an S1 input, an input connected to the PW1 output, and a PWM1 output;
(f) a second gate having an S2 input, an input connected to the PW2 output, and a PWM2 output; and
(g) a differential output circuit having an input coupled to the output of the first comparator, an S1 output connected to the S1 inputs and an S2 output connected to the S2 inputs.

8. The oscillator circuit of claim 7 in which the first input of the first comparator is a frequency voltage reference input.

9. The oscillator circuit of claim 7 in which the first inputs of the second and third comparators are duty cycle voltage reference inputs.

10. The oscillator circuit of claim 7 including a flip flop having an input connected to the output of the first comparator and an output connected to the input of the differential output circuit.

11. The oscillator circuit of claim 7 including a D-type flip flop having a clock input connected to the output of the first comparator, a D input, and an inverting output connected to the D input and the input of the differential output circuit.

12. A process of controlling an oscillator circuit comprising;
(a) producing a frequency voltage reference output from a first digital to analog converter;
(b) producing a pulse width voltage reference output from a second digital to analog converter;
(c) producing a first switch signal from the frequency voltage reference output;
(d) producing a first pulse width signal from the pulse width voltage reference output; and
(e) gating the first pulse width signal with the first switch signal to control the pulse width of an output signal.

* * * * *